Dec. 3, 1929.  G. BERNERT  1,737,561
PNEUMATIC CONVEYING APPARATUS
Filed April 7, 1924   2 Sheets-Sheet 1
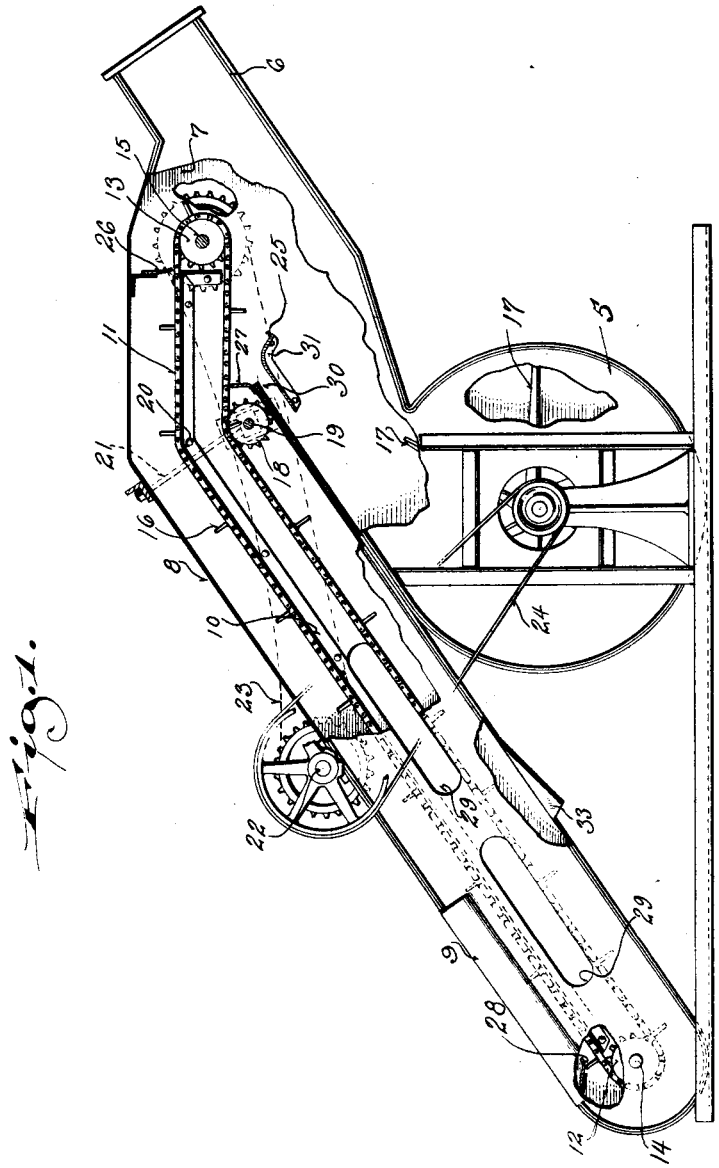
INVENTOR.
George Bernert
BY
Ira M. Jones
ATTORNEY.

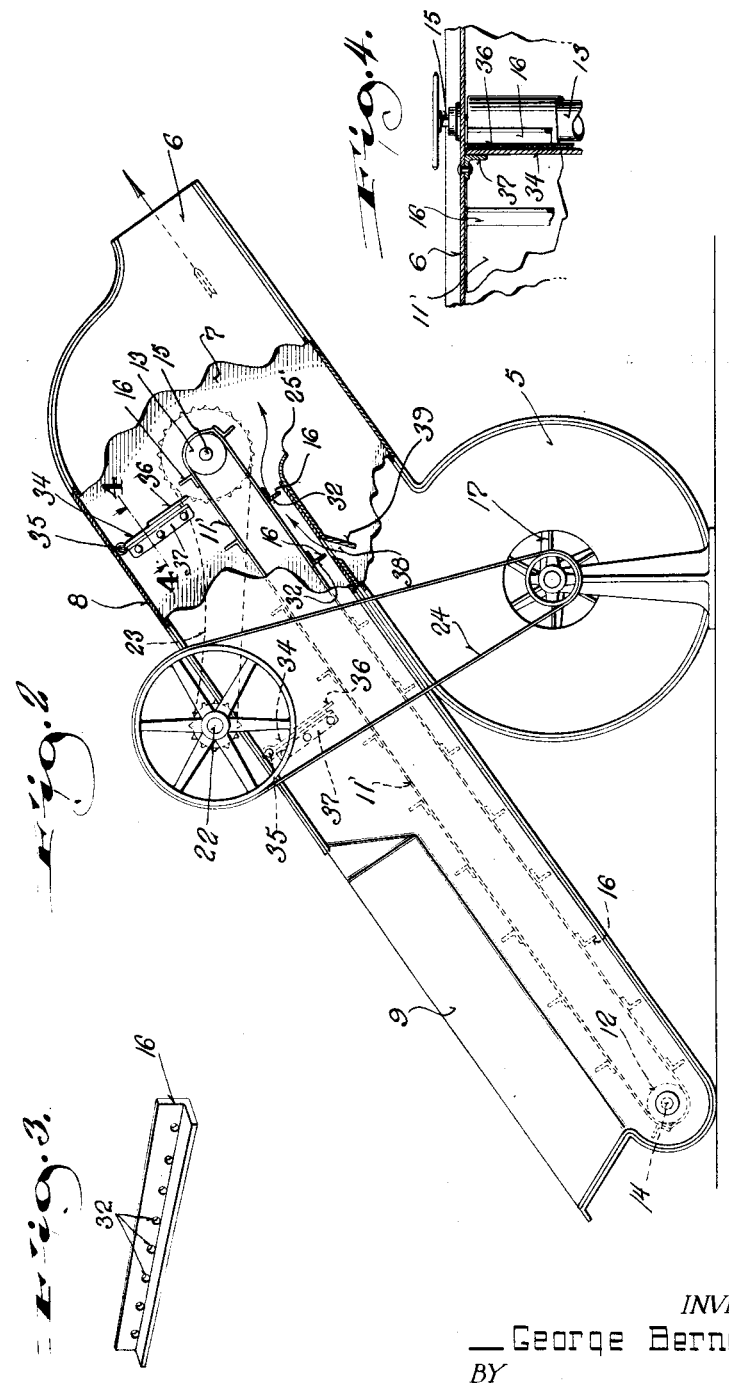

Patented Dec. 3, 1929

1,737,561

UNITED STATES PATENT OFFICE

GEORGE BERNERT, OF NORTH MILWAUKEE, WISCONSIN

PNEUMATIC CONVEYING APPARATUS

Application filed April 7, 1924. Serial No. 704,788.

This invention relates to certain new and useful improvements in pneumatic conveying apparatus of that general type including means for feeding material to be conveyed into an air duct against a conveying pressure of air therein.

In pneumatic conveying apparatus, it is a highly important consideration that back pressure within the means for feeding the material to be conveyed to the air duct be eliminated and one object of this invention resides in the utilizing of a portion of the conveying current of air to assist in the decreasing or limiting of back pressure in the material feeding means.

When an endless belt or chain carrying a plurality of flights or slats is employed to convey the material being handled through the conveyor casing to the pneumatic conveying duct, it has been found that the back pressure occurring in the conveyor casing tends to hold some of the material against the rear of the returning flights or slats, thus reducing the efficiency of the apparatus.

Having this objectionable feature in mind, this invention has for another of its objects the provision of means for removing all material tending to adhere to the returning flights or slats.

It is another object of this invention to provide a pneumatic conveying apparatus of the character described having means for directing a portion of the conveying current of air to sweep the means for feeding material to the conveying duct and, consequently, prevent the return of any part of the material into the casing enclosing the material feeding means.

Another object of the present invention is to provide a feeding conveyor casing having a conveying belt therein, one stretch of which rides over a partition plate which divides the casing into a conveying chamber and a return chamber for the belt, the space on the return side of the partition plate preferably communicating with the atmosphere in order that any back pressure accumulating therein may escape.

A further object of this invention resides in the provision of a conveying belt for feeding material to be conveyed into an air duct, the upper end of the conveying belt being preferably arranged on a plane angularly disposed with the plane of the lower portion of the belt whereby, material is discharged into the conveying air duct at the desired angle to be better picked up by the conveying current of air in the duct.

This invention has for a still further object to provide a deflector adjacent the opening in the air duct with which the material feeding means communicates, the area of the air duct at said deflector being substantially the same as the area of the conveying air duct beyond the opening and the longitudinal wall of said deflector preferably forming one wall for a bypass through which a portion of the conveying current of air passes to wipe the return side of the material feeding belt free of any material that may adhere thereto and thus prevent the return of any of the material to the feeding conveyor casing.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a side view of a pneumatic conveying apparatus embodying my invention, parts thereof being broken away and in section to illustrate structural details;

Figure 2 is a view similar to Figure 1 illustrating a slightly modified form of my invention;

Figure 3 is a perspective view of one of the perforated flights or slats employed in connection with my invention, and Figure 4 is a fragmentary sectional view taken through Figure 2 on the plane of the line 4—4.

Referring now more particularly to the accompanying drawings, 5 designates the usual blower fan casing of a pneumatic conveyor unit from which extends a conveying air duct 6 having in its top an inlet opening 7 with which a material supplying member communicates. The material supplying member comprises a feeding conveyor casing 8 which communicates at its upper discharge end with opening 7 and has its lower receiving end shaped to form a hopper or material receiving member 9 by striking outwardly and upwardly the side walls thereof.

The upper discharge end of casing 7 is preferably at an angle with respect to the lower major portion of the casing and positioned in the casing, throughout substantially its entire length, is a partition plate 10, the upper portion of which is also at an angle with respect to its lower portion and this partition plate provides a support for the upper stretch of an endless conveying belt. The conveying belt, in the present instance, is in the form of two link chains 11 trained about sprocket wheels 12 and 13 mounted on shafts 14 and 15 journaled in the lower receiving end and the upper discharge end, respectively, of casing 8. Chains 11 are connected by a plurality of spaced flights or conveying members 16 which carry the material placed in casing 8 at its receiving hopper 9 upwardly to be discharged into the air duct 6 through opening 7, where it is picked up by a conveying current of air created by a fan or blower 17 mounted in casing 5.

The lower stretch of the conveying belt, or chains, 11 passes over a guide, or idle sprocket wheel 18, mounted on a shaft 19 adjustably secured in casing 8 at a point adjacent the angle 20 in the casing, partition plate 10 and belt 11. Shaft 19 is readily adjustable by means of bolts 21 (but one being shown) to regulate the tension of belt 11 and accommodate for the stretching thereof, as will be readily obvious. Belt 11 and fan 17 are preferably driven from a common drive shaft 22 by means of a sprocket and chain connection 23 and a belt connection 24, respectively.

As illustrated, the inner-most end of belt 11 is so positioned that the area of duct 6 thereadjacent is substantially equal to the area thereof outwardly of opening 7 so that the conveying current of air is not permitted any degree of expansion. In order to insure the proper discharge of material into duct 6, I provide a deflector 25, and duct 6 is preferably enlarged at the point of the deflector, so that the area of the duct is not decreased.

Back pressure within casing 8 is restricted, if not altogether eliminated, by flexible valve members 26 and 27 arranged to engage the upper and lower stretches of the conveying belt, respectively, adjacent opening 7 and any possible disturbance of the material within the hopper 9, in the event there should be a slight back pressure in casing 8, is eliminated by an extra valve 28 positioned adjacent the lower end of the hopper.

As a further safeguard against the accumulation of back pressure within casing 8, the side walls thereof are provided with openings or outlets 29 which communicate with the interior of the casing on the return side of plate 10. With this construction any back pressure, which might escape into the interior of the casing, will expand and pass through openings 29 as will be readily obvious.

The operation of my improved conveying apparatus is substantially as follows:

The material to be conveyed is discharged into hopper or receiver 9 by any desired means and fed upwardly by the flights 20 on belt 11, the flexible valve 26 giving to permit the material and the flights to pass therebeneath and the material being thrown into the current of conveying air in duct 6. As before stated a comparatively small part of the conveying current of air passes through a by-pass or passage 30 defined by the portion 31 of deflector 25 and the lower stretch of the conveying belt, this part of the conveying current of air serving to wipe the returning flights and belt free of any material that may tend to cling thereto. By reason of the deflector 25, which serves to facilitate the discharge of the material into the air duct, causing a substantially dead air space adjacent its outer face, that part of the air passing through bypass 30 will again join and commingle with the major part of the conveying air which passes through duct 6 direct.

As illustrated in Figure 3, the flights or slats 16 have a plurality of apertures 32 therein and any material tending to adhere to the flights, either due to the characteristics of the material or the effect of back pressure, is removed therefrom and discharged into the air duct by the current of air passing through the passage 30.

In the event the current of air ejected against the flights through the passage 30 should fail to remove all the material adhering thereto, it will be discharged through an opening 33 which may be either closed by a suitable movable member, not shown, or left open to the atmosphere.

In that form of my invention illustrated in Figure 2, an endless belt 11′ is employed in place of the chains and the upper end thereof is not disposed at an angle to its lower end, although this feature may be incorporated in this form of my invention.

Back pressure within the casing 8 is reduced to a minimum, if not all together eliminated, by a valve member 34 swingingly suspended from a rod 35 extending across the casing 8 adjacent the top or outer wall thereof. A flexible packing member 36 is mounted on the lower end of the valve member and engages the flights 16 as they pass thereunder and the sides of the valve 34 engage flange members 37 secured to the side walls of the casing 8 to limit the rearward movement of the valve member and provide means for preventing the leakage of back pressure past the side edges of the valve member. As illustrated in Figure 2, one or more valve members 34 may be employed.

The wall of the air duct 6, inwardly of the opening 7, has a passage or opening 38 therein on the outer side of which is positioned an inclined deflector 39 whereby a portion of the conveying current of air is directed into the casing 8 against the return tread of the belt 11' and thence reenters the air duct through opening 7. An inturned lip 25' extends inwardly from the lower edge of the opening 7 to provide a deflector whereby material discharged into the opening is properly thrown into contact with the current of air and thus conveyed through the duct 6.

That portion of the conveying current of air entering the casing 8 sweeps the belt free of any material tending to adhere thereto as it returns to the hopper 9 and offsets any back pressure tending to accumulate on the under side thereof. By reason of the apertures 32, before described, all material tending to adhere to the rear side of the flights 16 is removed, as will be readily obvious.

What I claim as my invention is:

1. A pneumatic conveying apparatus, including a conveying air duct, means for procuring a conveying current of air in the duct, a feeding conveyor casing connected with the duct, a moving member in the casing, conveying members carried by the moving member and adapted to convey material through the casing to the air duct, said conveying members having apertures therein, and means for directing a current of air through the apertures of the conveying members after they have discharged the material into the air duct to remove any material tending to adhere thereto.

2. A pneumatic conveying apparatus, including a conveying air duct, means for procuring a conveying current of air in the duct, a feeding conveyor casing connected with the duct, a moving member in the casing, conveying members carried by the moving member and adapted to convey material through the casing to the air duct, said conveying members having apertures therein, and means for conducting a portion of the conveying current of air against the conveying members after they have discharged the material conveyed thereby into the air duct, whereby material tending to adhere to the conveying members is removed and discharged into the air duct.

3. A pneumatic conveying apparatus, including a conveying air duct, means for procuring a conveying current of air in the duct, a material endless conveyer member connected with the duct, said member discharging material to be conveyed into the duct, a deflector in the duct adjacent the point of connection of the material endless conveyor member with the duct, and a bypass adjacent the deflector, whereby a portion of the conveying current of air passes over the deflector, contacts with the material endless conveyor member and commingles with the conveying current of air at the other side of the deflector.

4. A pneumatic conveying apparatus, including a conveying air duct, means for procuring a conveying current of air in the duct, a feeding conveyor casing connected with the duct, an endless conveyor in said casing, conveying members carried by the endless conveyor, one end of the endless conveyor terminating adjacent the point of connection of the casing with said duct, a deflector in the duct adjacent the discharge end of the endless conveyor, and an air passage adjacent the deflector, whereby a portion of the conveying current of air passes over the deflector and into the duct again at the discharge end of the endless conveyor to sweep the conveying members free of material.

5. A pneumatic conveying apparatus, including a conveying air duct, means for procuring a conveying current of air in the duct, a feeding conveyor casing communicating at its upper end with an opening in the wall of the duct, a conveyor belt longitudinally mounted in the casing, the upper portion of the belt being at an angle with respect to the lower portion to discharge material to be conveyed into the air duct, and means for directing a portion of the conveying current of air along the under side of the upper portion of the belt.

6. A pneumatic conveying apparatus, including a conveying air duct, means for procuring a conveying current of air in the duct, a feeding conveyer casing communicating with the duct and divided into a material conveying portion and a return portion, and an endless mechanical conveyer within the casing and having its conveying stretch positioned within the casing conveying portion and its return stretch in the casing return portion, the materials being conveyed by the conveyer through the material conveying portion of the casing to be discharged into the air duct, and an outlet in the return portion of the conveyer casing for the release of back pressure tending to accumulate therein.

7. A pneumatic conveying apparatus, including a conveying air duct, means for procuring a conveying current of air in the duct, a feeding conveyor casing communicating with the duct, a partition plate extending through the casing, and means within the casing for conveying material to be conveyed through the casing, on one side of the plate, and into the air duct, said casing having an outlet, to the other side of the plate, to permit the escape of any air backed up therein.

8. A pneumatic conveying apparatus, including a conveying air duct, means for procuring a conveying current of air in the duct, a feeding conveyer casing connected with the duct, a moving member in the casing, conveying members carried by the moving member and adapted to convey material through the casing to the air duct, said conveying members having apertures therein, and means whereby air is passed through the apertures in the conveying members after they have discharged their load into the duct to remove any material tending to adhere thereto.

9. A pneumatic conveying apparatus including a conveying air duct, means for procuring a conveying current of air in the duct, a feeding conveyer casing connected with the duct at the top thereof, a moving member in the casing, conveying members carried by the moving member and adapted to convey material from the casing to the air duct, said conveying members having apertures therein, and a portion of the air passing through the apertures of the conveying members to clean the same.

In testimony whereof I affix my signature.

GEORGE BERNERT.